(12) United States Patent
Shiue et al.

(10) Patent No.: US 7,127,277 B2
(45) Date of Patent: Oct. 24, 2006

(54) HANDHELD ELECTRONIC DEVICE HAVING SHIFTABLE PIVOT STRUCTURE

(75) Inventors: Jih-Jong Shiue, Taipei (TW); Chien-Li Tsai, Taipei (TW)

(73) Assignee: High Tech Computer, Corp., Tao Yuan (TW)

( * ) Notice: Subject to any disclaimer, the term of this patent is extended or adjusted under 35 U.S.C. 154(b) by 456 days.

(21) Appl. No.: 10/655,900

(22) Filed: Sep. 4, 2003

(65) Prior Publication Data
US 2005/0003871 A1    Jan. 6, 2005

(30) Foreign Application Priority Data
Jul. 4, 2003    (TW) .............................. 92212331 U

(51) Int. Cl.
*H04M 1/00*    (2006.01)

(52) U.S. Cl. ................... 455/575.3; 455/566; 455/90.3

(58) Field of Classification Search ............ 455/575.3, 455/575.2, 575.8, 550.1, 90.3, 575.1–9, 403
See application file for complete search history.

(56) References Cited

U.S. PATENT DOCUMENTS

| | | | |
|---|---|---|---|
| 4,876,710 A | 10/1989 | Reed et al. | |
| 5,029,233 A | 7/1991 | Metroka | |
| 5,062,132 A | 10/1991 | Yasuda et al. | |
| 5,168,426 A | 12/1992 | Hoving et al. | ............... 361/392 |
| 5,259,018 A | 11/1993 | Grimmett et al. | |
| 6,052,604 A | 4/2000 | Bishop et al. | |
| 6,405,027 B1 | 6/2002 | Bell | |
| 6,441,790 B1 | 8/2002 | Forrester et al. | |
| 6,487,402 B1 | 11/2002 | Faus et al. | |
| 6,628,974 B1* | 9/2003 | Lim | ......................... 455/575.3 |
| 6,650,913 B1* | 11/2003 | Hayashi | ................... 455/575.3 |
| 6,819,947 B1* | 11/2004 | Okuda et al. | ............ 455/575.3 |
| 6,850,784 B1* | 2/2005 | SanGiovanni | ............ 455/575.1 |
| 6,934,568 B1* | 8/2005 | Charlier et al. | .......... 455/575.3 |
| 6,973,186 B1* | 12/2005 | Shin | ...................... 379/433.12 |
| 6,980,840 B1* | 12/2005 | Kim et al. | ................ 455/575.4 |
| 2002/0028655 A1 | 3/2002 | Rosener et al. | |
| 2002/0068543 A1 | 6/2002 | Shah | |
| 2002/0142803 A1 | 10/2002 | Yamamoto | |
| 2002/0173347 A1 | 11/2002 | Kinnunen | |
| 2003/0162560 A1* | 8/2003 | Kaneko | ...................... 455/550 |

FOREIGN PATENT DOCUMENTS

EP    1 312 999    5/2003

\* cited by examiner

*Primary Examiner*—Nick Corsaro
*Assistant Examiner*—Sayed T. Zewari
(74) *Attorney, Agent, or Firm*—J.C. Patents

(57) ABSTRACT

A handheld electronic device comprises a shiftable pivot structure (230) interconnecting a flip cover (210) to a base (220) of the device. The base has a pivotal accommodation groove (224) and the flip cover has a pivot sleeve (212). The shiftable pivot structure comprises a sliding axle (240) slideably fitted in the pivotal accommodation groove. The shiftable pivot structure is hinged to the pivot sleeve. When the flip cover is closed, the pivot sleeve of the flip cover can be moved to be hidden within the pivotal accommodation groove to get protection and to keep the appearance of the device neat. For communication, the flip cover needs to be opened, which is accomplished by firstly shifting the pivot sleeve and the sliding axle outwardly to a position in which the pivot sleeve protrudes from the pivotal accommodation groove, and then pivoting the flip cover relative to the base to an open position.

9 Claims, 4 Drawing Sheets

HANDHELD ELECTRONIC DEVICE HAVING SHIFTABLE PIVOT STRUCTURE

CROSS-REFERENCE TO RELATED APPLICATION

This application claims the priority benefit of Taiwan application Ser. no. 92212331, filed Jul. 4, 2003.

BACKGROUND OF THE INVENTION

1. Field of Invention

The present invention relates to a handheld electronic device. More particularly, the present invention relates to a handheld communication device having a shiftable pivot structure slideably and pivotably interconnecting a base and a cover of the handheld communication device.

2. Description of Related Art

Handheld electronic devices are gadgets that are portable and small in size, for example, mobile phone, pocket Personal Computer (pocket PC), Personal Digital Assistant (PDA), or portable Personal Computer (portable PC), are all classified. Thus handheld electronic devices have become one of the most popular high-tech commercial products for convenience, effectiveness, as well as better quality of mobile communication are brought in the fields of wireless communication and Internet.

FIG. 1 is a stereogram showing a conventional flip-cover handheld electronic device having a pivot structure 130 pivotably interconnecting a cover 110 and a base 120 thereof. The handheld electronic device in the shown example is a mobile phone. The cover 110 comprises a pivot shaft 112, whereas the base 120 comprises a pair of corresponding pivot joints 124 and 126 engaging with the ends of the pivoting shaft 112, so that the cover 110 is able to pivot relative to the base 120. When a user lifts up the cover 110, a display screen 114 on the cover 110 shows all talk functions, whereas the user may press the numerical keypad 122 or other functional keys, or answer calls to make conversation with the other party. Thus, the cover 110 not only protects the display screen from inexpectant external impact, but also miniaturizes the size of mobile phone so as to keep up with the current trend for portable products.

Note that one disadvantage of deploying this fixed pivot structure 130 is that the pivoting shaft 112 is exposed when the cover 110 is closed so that the pivoting shaft 112 is vulnerable regarding external impact. Once the pivoting shaft 112 is critically damaged, a user can no longer flip open the cover 110 to conduct talk function. In addition, the exposure of the pivoting shaft 112 outside the cover 110 and the base 120 as well degrades neatness and aesthetics of appearance.

SUMMARY OF THE INVENTION

Accordingly, one object of the present invention is to provide a handheld electronic device having a shiftable pivot structure for connecting a flip cover to a base of the handheld electronic device. The design not only protects the pivot structure against external impact, but also provides a better appearance of the device.

To achieve these and other advantages and in accordance with the purpose of the invention, as embodied and broadly described herein, the invention provides a handheld electronic device having a shiftable pivot structure for connecting a flip cover to a base. The base comprises a pivotal accommodation groove and the cover comprises a second pivot sleeve. The shiftable pivot structure mainly comprises a sliding axle and a shaft, where the sliding axle is accommodated to the pivotal accommodation groove. The sliding axle further comprises a lever and two first pivot sleeves. The two ends of the lever are located on the interior sidewalls of the pivotal accommodation groove. In addition, the two first pivot sleeves extend from two sides of the lever, respectively, to form a U-shaped pivot bearing. The sliding axle is designed movable within the pivotal accommodation groove, which provides sufficient space for accommodating the two first pivot sleeves for full retraction. Moreover, the shaft extends in the two first pivot sleeves and the second pivot sleeve to serve as a pivot joining the first and second pivot sleeves together.

The sliding axle is capable of being shifted outwardly so that the two first pivot sleeves are stationed outside an opening defined by the pivotal accommodation groove extending through a front end of the base. At this position, the cover can be pivoted relative to the base to an open position in which the handheld electronic device can be operated by a user of the device. After the operation, the cover is pivoted toward to the cover to a closed position. Then, the slide axle is shifted inwardly in the pivotal accommodation groove to a position in which the two first pivot sleeves are completely received in the pivotal accommodation groove. At this position the handheld electronic device cannot be operated, the shiftable pivot structure is totally hidden in the pivotal accommodation groove, and the cover is incapable of being pivoted relative to the base.

According to one embodiment of this invention, the base and the cover are fabricated using a material such as plastic or metallic substance. The pivotal accommodation groove in the base is formed as an integrative unit by punching or molding the base, for example.

In this invention, the first and second pivot sleeves and the pivot shaft can be hidden within the pivotal accommodation groove when the flip-cover is closed. Thus, the pivot structure in this present invention is protected from any external impact as well as has smooth and aesthetically appealing appearance when the device is at a closed position. Moreover, the cover is lifted for communication inasmuch as the shiftable character of the sliding axle wherein the first and second pivot sleeves and the shaft are moved to protrude beyond the base thereof.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENT

Figure 1:
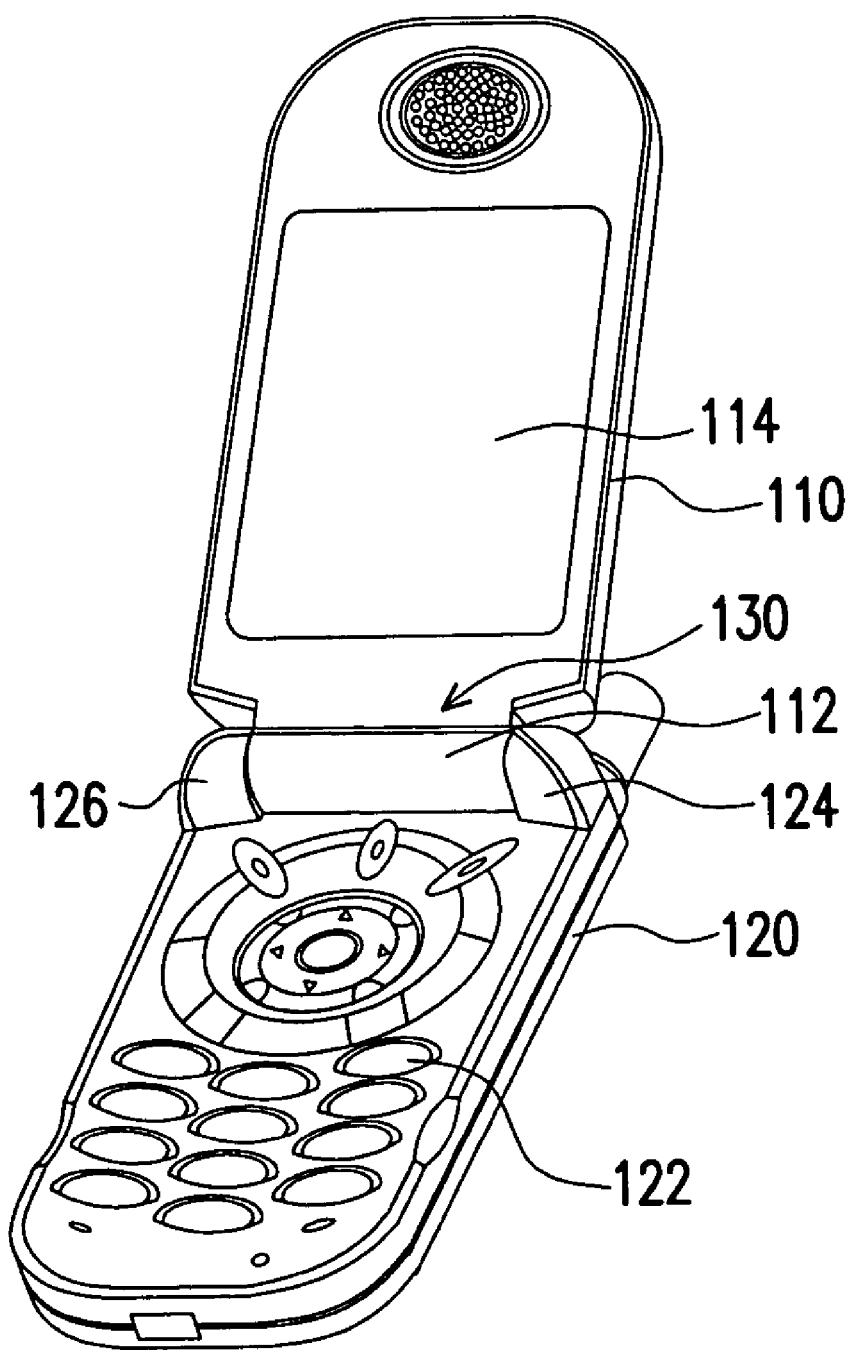
FIG. 1 is a stereogram showing a handheld electronic device having a conventional pivot structure.

Reference will now be made in detail to the present preferred embodiment of the invention, example of which is illustrated in the accompanying drawings. Wherever possible, the same reference numbers are used in the drawings and the description to refer to the same or like parts.

Figure 2A:
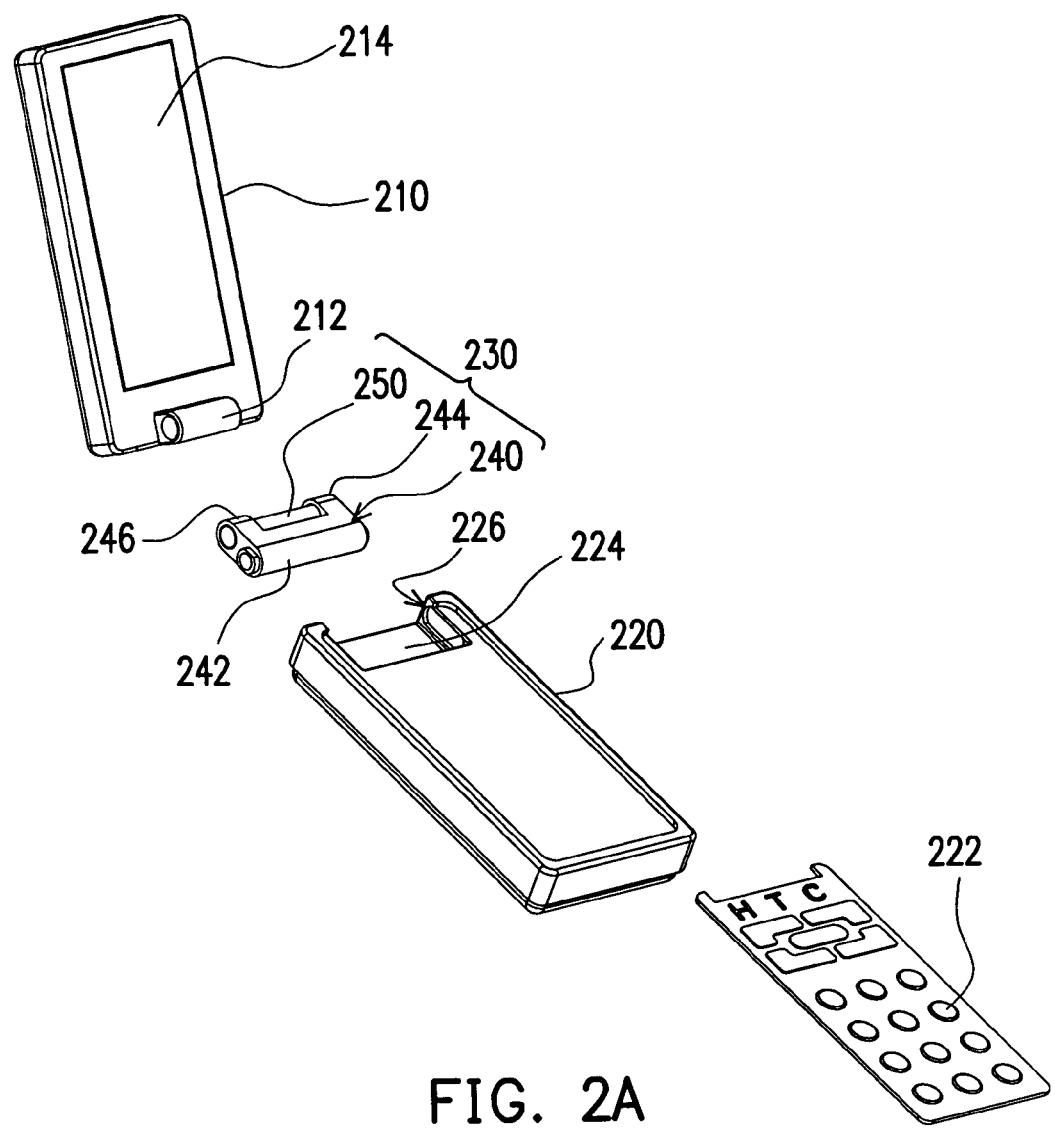
FIGS. 2A and 2B are stereograms respectively showing an exploded and an assembled view of a handheld electronic device having a shiftable pivot structure according to one preferred embodiment of this invention.
Figure 2B:
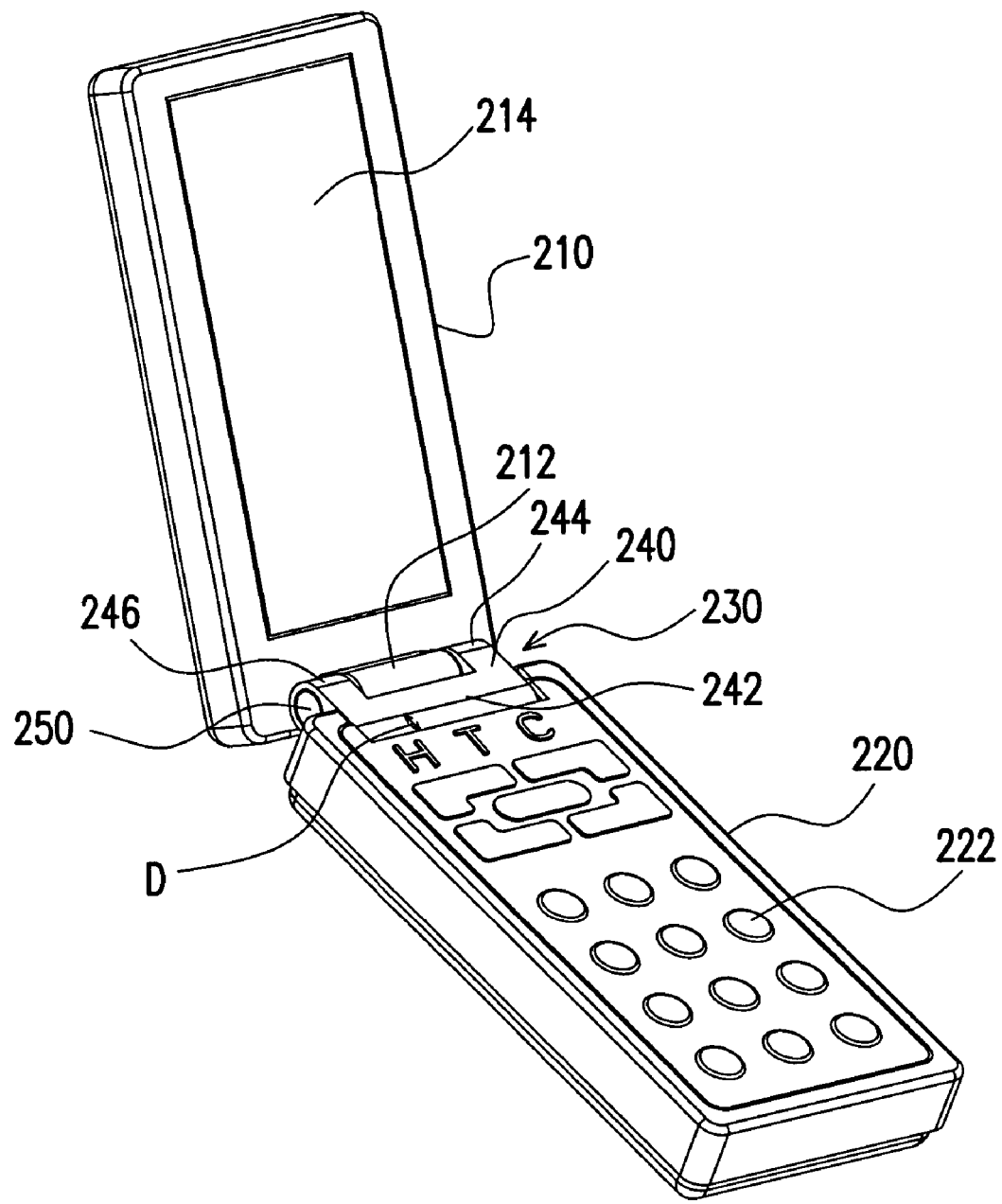

Referring to FIGS. 2A and 2B, the handheld electronic device according to one preferred embodiment of this invention is a handheld wireless communication device, i.e., more specifically, a mobile phone. As shown in FIGS. 2A and 2B, the device has a cover 210 and a base 220 assembled together via a shiftable pivot structure 230. The shiftable pivot structure 230 comprises a sliding axle 240 and a shaft 250. The base 220 comprises a pivotal accommodation groove 224, which is a fillister on the surface of the base 220. The pivotal accommodation groove 224 also is extended to a front wall of the base 220 to form an opening 226. Note that the pivotal accommodation groove 224 is formed as an integrative unit with the base 220 by punching or molding, for example, while the base 220 and the cover 210 are fabricated using a plastic or a metallic substance, for example.

The sliding axle 240 accommodated to the pivotal accommodation groove 224 comprises a lever 242 with two lateral ends respectively latched to the interior sidewalls of the pivotal accommodation groove 224, and two pivot sleeves 244 and 246 extending forwardly from the two ends of the lever 242. The pivot sleeves 244 and 246 define holes (not labeled) which are aligned with each other. The pivot sleeves 244 and 246 and the lever 242 together form a U-shaped pivot bearing. In addition, another pivot sleeve 212 is attached to a bottom of the cover 210. The pivot sleeve 212 fits in a gap (not labeled) between the two pivot sleeves 244 and 246 of the sliding axle 240. The shaft 250 extends in the two pivot sleeves 244, 246 of the sliding axle 240, and the pivot sleeve 212 of the cover 210. The shaft 250 is fixed to the pivot sleeves 244, 246 while the pivot sleeve 212 can rotate about the shaft 250 so that the cover 210 can pivot relative to the sliding axle 240 and the base 220. Accordingly, the a structure in accordance with the present invention which can both slide in the base 220 and pivotably connect with the cover 210 is formed.

As shown in FIG. 2B, the cover 210 that is hinged to the base 220 via the shiftable pivot structure 230 comprises the sliding axle 240 and the shaft 250. The two pivot sleeves 244, 246 of the sliding axle 240 are stationed outside the opening 226 provided that the lever 242 of the sliding axle 240 is shifted outwardly from an inner side of the pivotal accommodation groove 224 by a distance D. At this position, the cover 210 is free to pivot relative to the base 220. Thus, when a user flips open the cover 210, a display screen 214 on the cover 210 shows communication functions thereof. In the meantime, the user is also free to press any numerical keypad 222 or other functional keys on the keypad on the base 220, as well as to make conversation with another party.

Figure 3A:
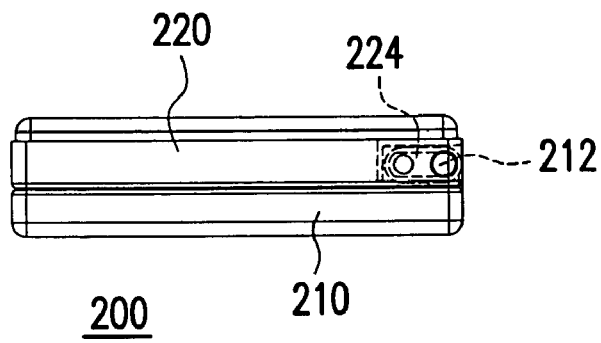
FIGS. 3A through 3C are side views respectively showing different positions of a cover relative to a base of the handheld electronic device in accordance with the preferred embodiment of the present invention.
Figure 3B:
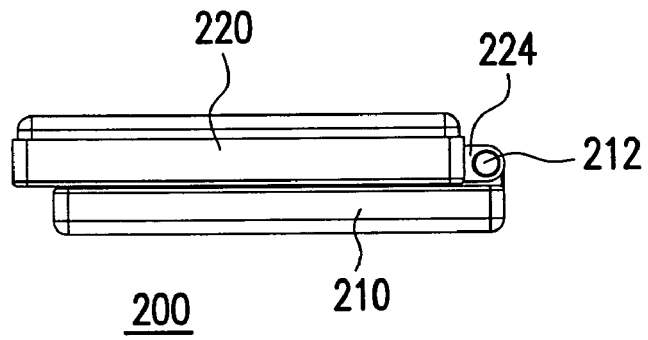
Figure 3C:
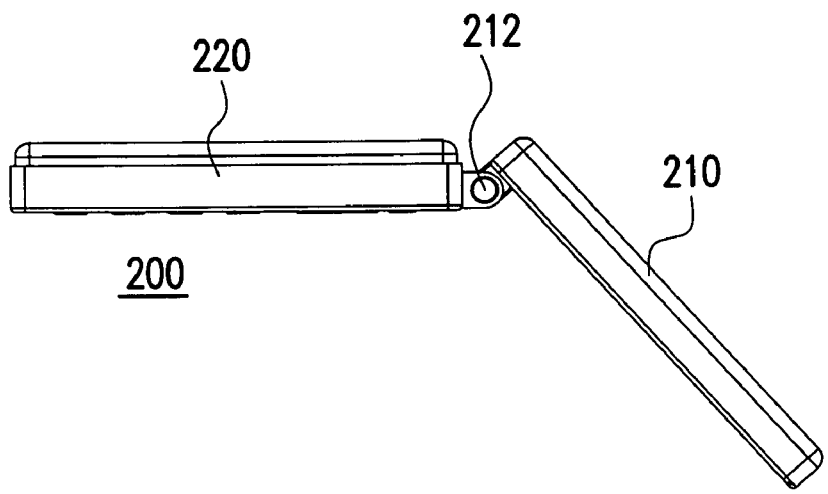

In FIG. 3A, the cover 210 is at close mode, wherein the shiftable pivot structure 230 and the pivot sleeve 212 are hidden within the pivotal accommodation groove 224 of the base 220. Thus, the shiftable pivot structure 230 and the pivot sleeve 212 are covered and protected from impact, and the neatness of the handheld electronic device 200 is created as well. In FIG. 3B, the cover 210 together with the sliding axle 240 is shifted forwardly relatively to the base 220 the distance D so that the pivot sleeve 212 protrudes beyond the base 220. In FIG. 3C, the cover 210 of the handheld electronic device 200 is flipped open to be ready for communication.

Accordingly, this invention provides a shiftable pivot structure for joining a cover and a base of a handheld electronic device together. The base has a pivotal accommodation groove and the cover has a second pivot joint (for example, the pivot sleeve 212). The shiftable pivot structure at least includes a sliding axle that is accommodated to the pivotal accommodation groove. Furthermore, the sliding axle has a first pivot joint (for example, the pivot sleeves 244, 246) hinging with the second pivot joint. With the first pivot joint of the sliding axle and the second pivot joint of the cover hidden inside the pivotal accommodation groove, the pivot structure is hardly damaged by external impact. Moreover, designing shiftable pivot structure to be hidden inside the base makes the handheld electronic device appear to be neater and more aesthetic.

In conclusion, major advantages of the shiftable pivot structure according to this invention includes:

1. The pivot joint of the cover and the pivot joint of the sliding axle are both hidden in the pivotal accommodation groove so that they are free from exposure and damage caused by external impact when the cover is closed. Moreover, this shiftable pivot structure appears to be neater for a handheld electronic device.

2. By shifting the sliding axle from an inner position to an outer position, the pivot sleeves and shaft are able to extrude from the base so that the cover serves to be opened for communication.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device having a shiftable pivot structure for joining a flip cover and a base of the device together, wherein the base comprises a pivotal accommodation groove and the cover comprises a pivot sleeve, the shiftable pivot structure comprising:

a sliding axle fitting in the pivotal accommodation groove, wherein the sliding axle comprises a lever and a pivot sleeve, two ends of the lever are respectively located on interior sidewalls of the pivotal accommodation groove, the pivot sleeve of the sliding axle extends from the lever to be hinged with the pivot sleeve of the cover at a connection point, the connection point being movable between positions inside and outside the pivotal accommodation groove, at the position outside the pivotal accommodation groove, the flip cover being pivotable relative to the base.

2. The handheld electronic device of claim 1, wherein the pivot sleeve of the sliding axle is hinged to the pivot sleeve of the cover by a shaft that extends in the two pivot sleeves.

3. The handheld electronic device of claim 1, wherein the flip cover is provided with a display and the base is provided with a keypad.

4. The handheld electronic device of claim 1, wherein the pivotal accommodation groove extends through an end of the base to form an opening in the base, and the connection point is moved from the position inside the pivotal accommodation groove to the position outside the pivotal accommodation groove through the opening.

5. The handheld electronics device of claim 1, wherein the pivotal accommodation groove extends through an end of the base to define an opening in the base, and wherein when the connection point moves from the position inside the pivotal accommodation groove to the position outside the pivotal accommodation groove, the connection point moves through the opening.

6. A handheld electronic device, comprising:
 a base comprising a numerical keypad for inputting data and a pivotal accommodation groove located at one end of the base;
 a shiftable pivot structure fitted in the pivotal accommodation groove and being shiftable from a first position to a second position, wherein the shiftable pivot structure comprises a first pivot joint located entirely within the pivotal accommodation groove when the shiftable pivot structure is shifted to the first position, and located outside the pivotal accommodation groove when the shiftable pivot structure is shifted to the second position; and
 a flip cover comprising a display screen for displaying data, and a second pivot joint that is pivotably joined to the first pivot joint.

7. The handheld electronic device of claim 6, wherein the first pivot joint comprises two first pivot sleeves and a shaft, the second pivot joint comprises a second pivot sleeve, and the shaft extends in the first pivot sleeves and the second pivot sleeve.

8. The handheld electronic device of claim 6, wherein the flip cover is pivotable relative to the base when the shiftable pivot structure is shifted to the second position.

9. The handheld electronic device of claim 6, wherein the flip cover is pivotable relative to the base when the shiftable pivot structure is shifted to the second position.

* * * * *